United States Patent [19]

Bacardit

[11] Patent Number: 4,765,369
[45] Date of Patent: Aug. 23, 1988

[54] HYDRAULIC DISTRIBUTOR, PARTICULARLY FOR A POWER-ASSISTED STEERING SYSTEM FOR A VEHICLE

[75] Inventor: Juan S. Bacardit, Barcelona, Spain

[73] Assignee: Bendix Espana S.A., Barcelona, Spain

[21] Appl. No.: 54,720

[22] Filed: May 27, 1987

[51] Int. Cl.[4] .............................................. F15B 9/10
[52] U.S. Cl. ............................ 137/625.21; 91/375 R
[58] Field of Search ...................... 137/625.21, 625.22, 137/625.23, 625.24; 91/375 R, 375 A; 137/625.69

[56] References Cited

U.S. PATENT DOCUMENTS

| | | | |
|---|---|---|---|
| 4,285,266 | 8/1981 | Elser | 91/375 A |
| 4,335,749 | 6/1982 | Walter | 91/375 A |
| 4,353,288 | 10/1982 | Holub | 91/375 A |
| 4,445,422 | 5/1984 | Bishop | 91/434 |

FOREIGN PATENT DOCUMENTS 2160548  6/1973  France.
1535722  12/1978  United Kingdom.

*Primary Examiner*—Alan Cohan
*Attorney, Agent, or Firm*—Larry J. Palguta; Ken C. Decker

[57] ABSTRACT

The hydraulic distributor, of the type comprising, in each of two parallel circuits ($\alpha$, $\alpha'$), between a pressure source (S) and a tank (R), two modulable restrictions in series (A, B; A', B'), comprises in addition, in each circuit ($\alpha$, $\alpha'$), a first (C; C') and a second (D; D') fixed restriction adapted to be put into operation alternately in synchronism with the modulable restrictions downstream of each of the latter, the fixed restriction put into operation being the one directly downstream of the modulable restriction operated in its closing direction.

6 Claims, 3 Drawing Sheets

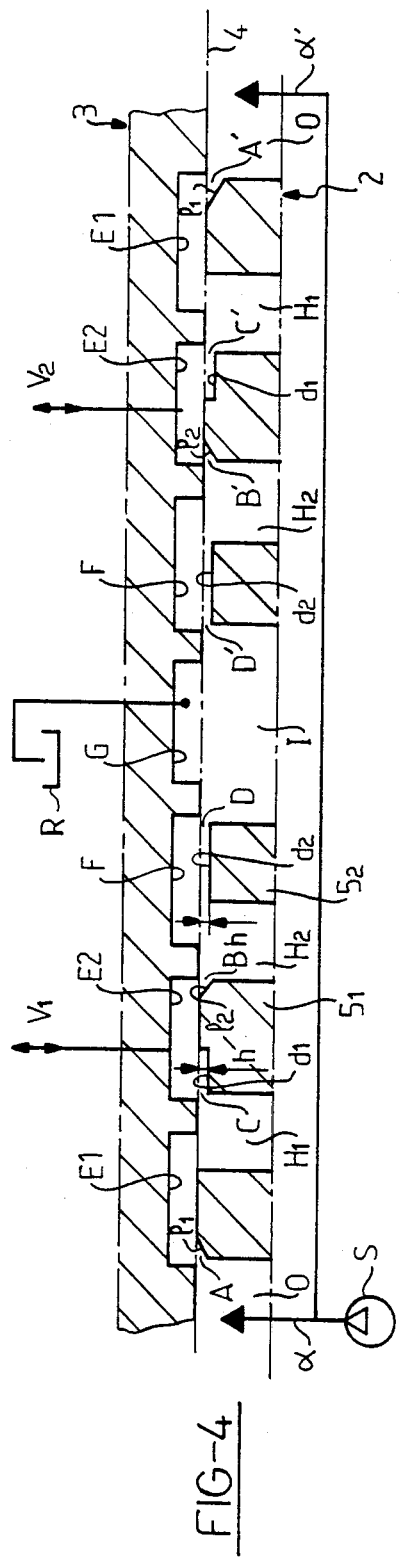
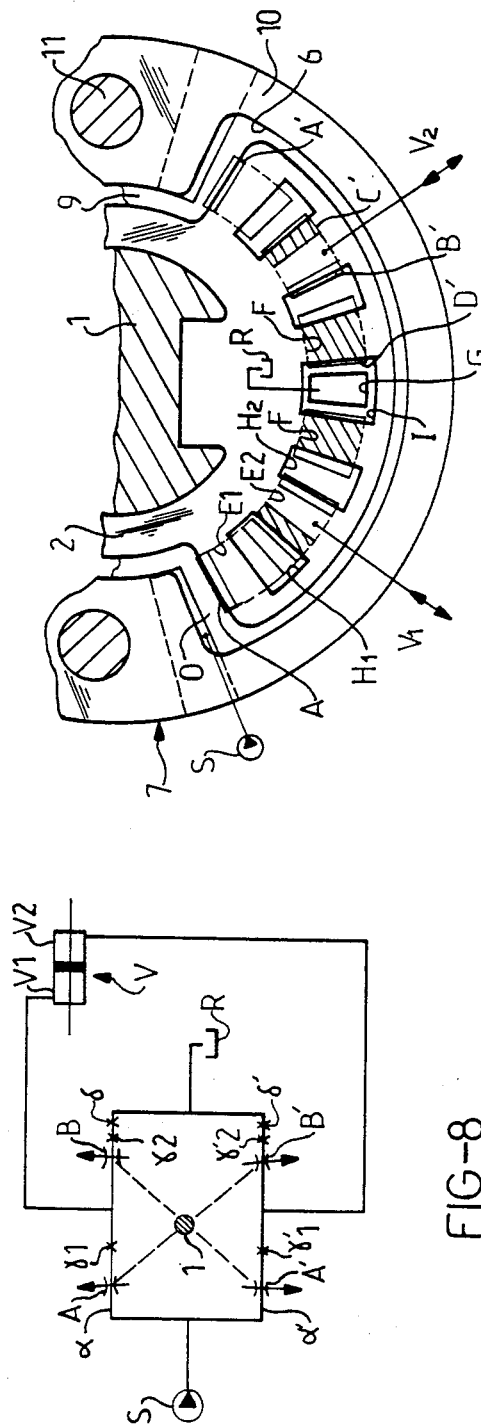
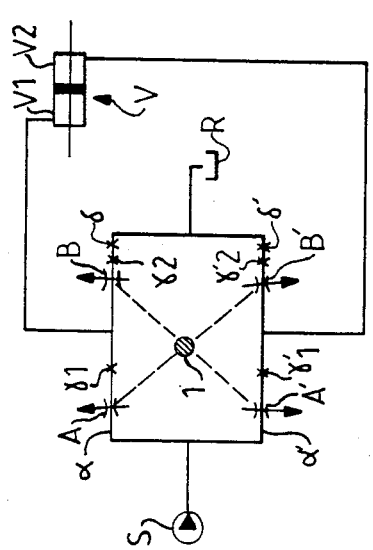
FIG-4
FIG-5
FIG-8

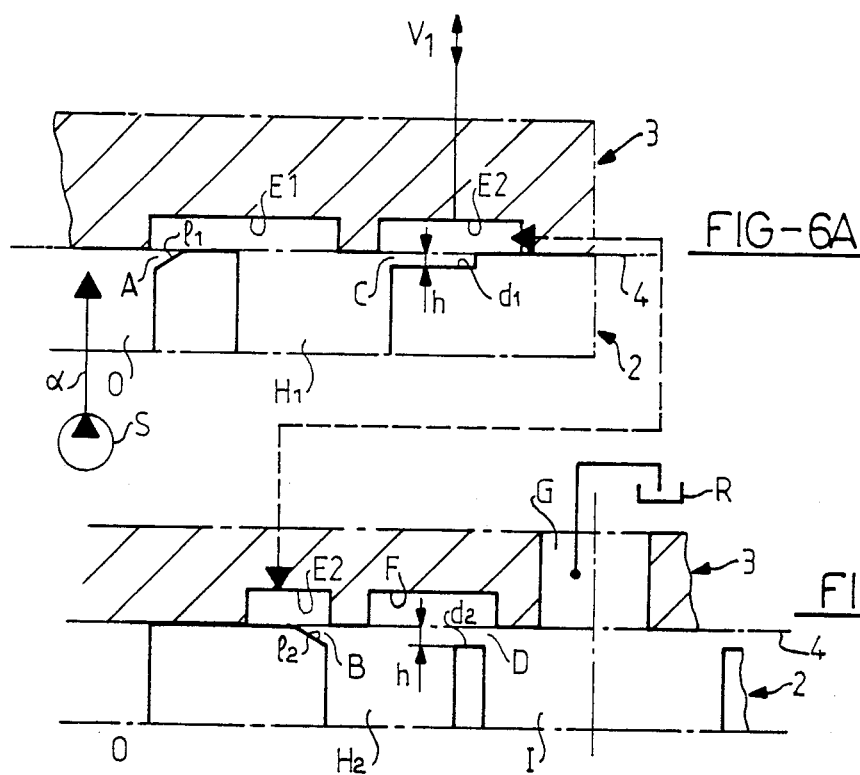
FIG-6A
FIG-6B
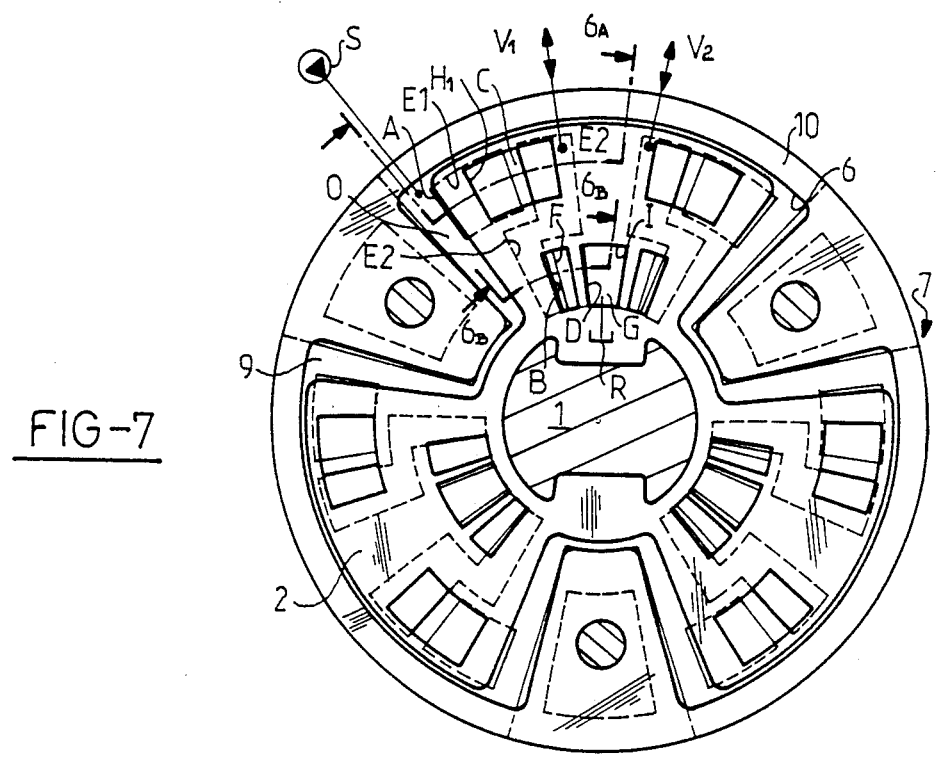
FIG-7

HYDRAULIC DISTRIBUTOR, PARTICULARLY FOR A POWER-ASSISTED STEERING SYSTEM FOR A VEHICLE

The present invention relates to hydraulic distributors, particularly for power-assisted steering systems for vehicles, which is of the type comprising a pair of parallel circuits between a pressurized fluid source and a tank, each parallel circuit comprising, in series, at least one first and one second modulable distribution restriction, the modulable restrictions of the two circuits being adapted to be operated in synchronism by an inlet component of the distributor for the purpose of controlling a hydraulic motor having opposed chambers each connected to a respective parallel circuit at a point in the latter which is situated between the first and second modulable restrictions of the associated pair, and further comprising a fixed restriction put into operation by the inlet component in each parallel circuit in synchronism with the modulable distribution restrictions.

A hydraulic distributor of this type is described in document U.S. Pat. No. 4,335,749. In this document, which describes a hydraulic distributor of the type comprising a cylindrical sleeve and rotor, the fixed restriction in the form of a through passage of reduced section provided in the rotor is put into operation, on the actuation of the rotor, downstream of the second modulable distribution restriction operated in the opening direction in order to permit the relief of the non-pilot controlled chamber of the hydraulic motor, closing the direct passage between said second modulable distribution restriction and the return to the tank, in order to force the flow of hydraulic fluid returning to the tank to follow a branched path passing through this fixed restriction. Although an arrangement of this kind makes it possible in a manner known per se to limit noise of hydraulic origin when the distributor is put into operation, by introducing a loss of head in the return circuit to the tank, the operation, that is to say the insertion into the circuit, of the fixed restriction is effected in an uncontrolled manner which may entail the risk of cavitation or even of hammering in the distributor.

The present invention seeks to provide an improved hydraulic distributor of this type which makes it possible to reduce significantly noise of hydraulic origin when it is put into operation, with the aid of an arrangement of simple, reliable and robust construction, which does not affect the accuracy and balance of the distributor, which is inexpensive to manufacture, and which allows numerous adaptations depending on the type of distributor concerned.

For this purpose, according to one characterisic of the invention the distributor comprises first and second fixed restrictions adapted to be operated alternately by the inlet component in each parallel circuit, downstream of the first modulable distribution restriction.

According to one aspect of the invention, the first and second fixed restrictions are adapted to be put into operation downstream of the second modulable distribution restriction.

According to another preferential aspect of the invention, the first and second fixed restrictions are adapted to be put into operation respectively downstream of the first and second modulable distribution restrictions, the fixed restriction put into operation being the one downstream of the modulable distribution restriction operated in the closing direction.

With an arrangement of this kind a normally non-operative fixed restriction is put into operation or introduced, as soon as the distributor is actuated, in each parallel circuit downstream of the modulable restriction of each circuit operated in the closing direction, thus giving rise, immediately downstream of the modulable distribution restriction which closes, to a back pressure with a loss of head enabling the fluid flow, which is greatly disturbed and has become turbulent because of the closure of the modulable distribution restriction, to return to a predominantly laminar state of flow, thus considerably reducing noise of hydraulic origin in the distributor.

Other characteristics and advantages of the present invention will emerge from the following description of embodiments given by way of illustration but without in any way constituting a limitation, this description being given with reference to the accompanying drawings, in which:

FIG. 4 is a block diagram similar to that in FIG. 1, showing a second embodiment of the invention;

FIG. 5 is a partial schematic view in cross-section of a hydraulic distributor of the star-shaped rotor type arranged in accordance with the diagram shown in FIG. 4;

FIGS. 6A and 6B are block diagrams taken on the sectional lines 6A and 6B in FIG. 7, similar to the diagrams in FIGS. 1 and 4 and showing another embodiment of the invention;

FIG. 7 is a similar view to FIG. 2 of a hydraulic distributor having a star-shaped rotor and arranged in accordance with the diagram shown in FIG. 6A and 6A, and FIG. 8 is a schematic diagram illustrating the installation of a hydraulic distributor according to the invention in a hydraulic motor control circuit.

Figure 1:
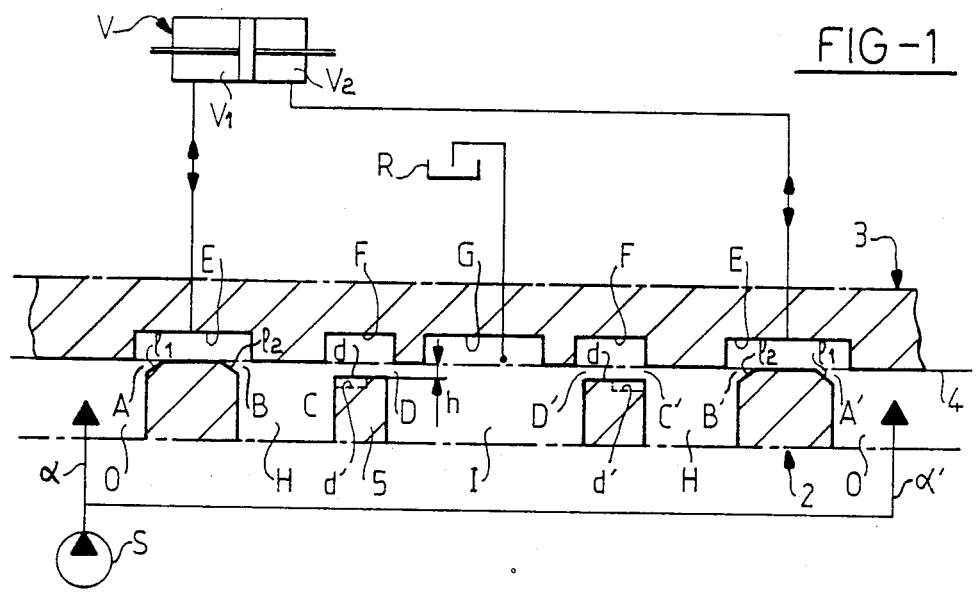
FIG. 1 is a developed block diagram of a first form of construction of a hydraulic distributor according to the invention.

In the following description and in the drawings identical or similar components are given the same references, with the addition of primes or subscripts where applicable.

In the description and in the claims the expression "fixed restriction" is understood to mean a constriction having a constant reduced passage section over the greater part of the operating stroke of the distributor. By the "putting into operation" of the fixed restriction is understood the introduction of this fixed restriction, starting from a given moment of time, into a fluid flow path not previously called upon to pass through this fixed restriction.

Reference will first be made to FIG. 8, which illustrates a conventional layout of a hydraulic distributor for controlling a hydraulic motor V comprising a pair of antagonistic operating chambers $V_1$ and $V_2$. The hydraulic distributor defines, between a pressure source S and a low-pressure tank or reservoir R, two parallel fluid circuits $a, a'$, each comprising a first and a second modulable restriction A, B and A', B' respectively, these restrictions being adapted to be put into operation synchronously by an inlet component 1 of the distributor, this component being for example coupled to a steering wheel for a power-assisted steering system for an automobile vehicle, while the hydraulic motor V is in that case coupled to the steering mechanism or the steerable wheels of the vehicle. With a steering arrangement of this, in conventional manner, when the inlet component 1 is operated in one direction the first restriction A opens at the same time as the second restriction B closes, the first restriction A' of the parallel circuit then closing at the same time as the second restriction B' of this other circuit opens, in such a manner as to produce an increase in pressure in the chamber $V_1$ of the hydraulic motor V, the fluid previously contained in the other chamber $V_2$ of the hydraulic motor being expelled to the tank through the second restriction B', which has opened. The operation of the distributor in the other direction is symmetrical in all respects.

Figure 2:
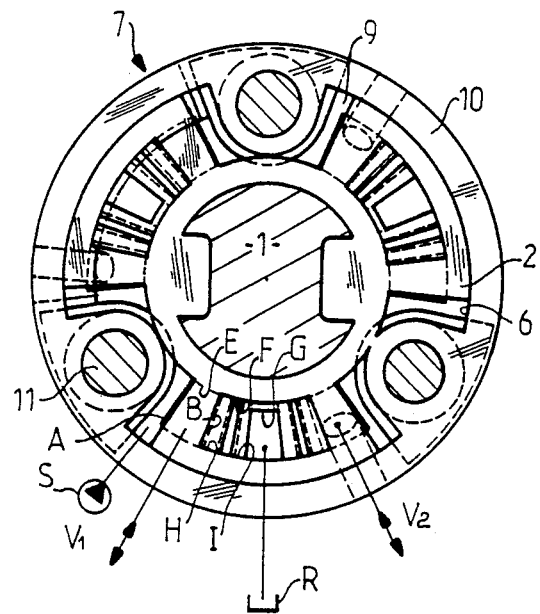
FIG. 2 is a schematic view in cross-section of a hydraulic distributor of the star-shaped rotor type arranged in accordance with the diagram shown in FIG. 1.
Figure 3:
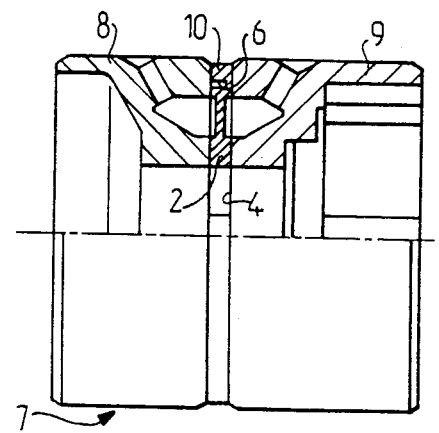
FIG. 3 is a schematic longitudinal half-section of the distributor shown in FIG. 2.

FIGS. 1 to 3 illustrate a first form of consruction of a hydraulic distributor according to the invention. In FIG. 1 it is possible to see the modulable restrictions A, B and A', B' formed by the cooperating edges of ports or openings formed respectively in a first distributor component 2 and in a second distributor component 3, these components having cooperating adjacent faces represented by the plane 4 of the contact interface between these cooperating faces of the distributor components 2 and 3. In conventional manner, the modulable restrictions are put into operation through the action of a relative displacement, parallel to the plane 4, of the distributor components 2 and 3 in relation to one another from a centered position of rest, which is the position shown in FIG. 1. More specifically, the first modulable restriction A is formed between the cooperating edges of an admission port O of the first distributor component 2, which port is connected to the pressure source S, and of a distribution port E formed in the second distributor component 3 and connected to the chamber $V_1$ of the hydraulic motor V. The second modulable restriction B is formed between the cooperating edges of the distribution port E and of an intermediate port H formed in the first distributor component 2 and isolated from the admission port O. In conventional manner the edges of the first distributor component 2 forming the first and second modulable restrictions A and B are provided with chamfers $l_1$ and $l_1$.

According to the invention, an intermediate port F is formed between a discharge port G, which is formed in the second distributor component 3 and connected to the tank R, and the distribution port E. In the first distributor component 2 a central port I is formed, which extends parallel to the plane 4 and on each side of the discharge port G to communicate with the adjacent intermediate port F, this central port I being separated from the intermediate port H by a solid web portion 5 of the first distributor component 2, said web portion 5 extending parallel to the plane 4 and below the intermediate port F, with the face d of said web portion which lies opposite the second distributor component 3 slightly offset by a distance h from the plane of the interface 4 (unlike the portions of the first distributor component 2 between the chamfers $l_1$ and $l_2$, of which the face directed towards the second distributor component 3 coincides with the interface plane 4, so as to permit complete closure of one or the other of the modulable restrictions A and B or A' and B'). It will thus be noted that when a relative displacement occurs between the distributor components 2 and 3, the portion 5 of the first distributor component 2 will form, in conjunction with one or the other of the edges of the intermediate port F, a fixed restriction C or D between the intermediate chamber F and the intermediate chamber H or the central chamber I, the section of the fixed restriction being determined by the aforesaid spacing distance h. The arrangement of the distributor just described is in every respect symmetrical in the case of the other parallel circuit $a'$.

It will thus be understood that, for example on the displacement of the first distributor component 2 to the left (in FIG. 1) in relation to the second distributor component 3, the modulable restrictions A and B' will close, while the modulable restrictions A' and B will open. When this relative displacement of the distributor components occurs, the fixed restrictions C and D' are then introduced into the respective parallel circuit, each respectively downstream of a modulable restriction which closes in the associated circuit. Thus, not only the fluid returning to the tank R and originating from the distribution port E of the chamber $V_1$, but also the residual flow of pressurized fluid escaping from the distribution port E of the chamber $V_2$ towards the tank, on the closure of the second modulable restriction B', will pass through the associated fixed restrictions C and D' which have been put into operation and which thus promote in the ports I and G a laminar flow permitting a reduction of noise of hydraulic origin, which may attain 30 dB. The hydraulic fluid pressure differential being lower between the distribution port corresponding to the discharging chamber of the motor V (that is to say $V_1$ in the above example) and the return ports I and G than between said ports I and G and the other distribution port when the distributor is put into operation, the restrictions C and C' may be smaller than the restrictions D and D', in which case the face d of the solid web portion 5 of the first distributor component 2 may have an additional step between the ports H and F, as shown at d' in FIG. 1.

FIGS. 2 and 3 illustrate a practical form of construction of the distributor shown schematically in FIG. 1. A distributor of this type, equipped with a star-shaped rotor, is described in particular in document EP-A-No. 0 095 415 in the name of the applicants, and the contents of this document will be assumed to be incorporated herein for reference. The first distributor component 2 is in the form of a flat star-shaped rotor having radial arms received in a discoid chamber 6 of a stator consisting of an assembly comprising two annular end components 8 and 9 and an annular spacing component 10 peripherally delimiting the chamber 6, the different components of the stator 7 being joined by bolts 11 extending axially between adjacent arms of the rotor 2. The rotor 2 is coupled centrally to an input shaft 1. As can be seen, the ports E, F, G are formed in at least one of the planar axial faces of the rotor arms, the ports H and I being formed in the rotor arms 2, while the admission ports O are formed between the adjacent arms of said rotor 2.

FIGS. 4 and 5 illustrate another form of construction of a distributor according to the invention. In this embodiment the first distributor component 2 comprises, between the admission port O and the central port I, two intermediate chambers $H_1$ and $H_2$ delimited by two separate web portions $5_1$ and $5_2$ of the first distributor component 2, the second distributor component 3 here comprising a first intermediate distribution port $E_1$ and a second distribution port $E_2$, the latter being connected to the corresponding chamber ($V_1$ or $V_2$) of the hydraulic motor. As can clearly be seen in FIG. 4, the first modulable restriction A is formed by the adjacent edges between the admission port O and the first distribution port $E_1$, while the second modulable restriction B is formed between the intermediate port $H_2$ of the first distributor component 2 and the adjacent edge of the second distribution port $E_2$ of the second distributor component 3. The first fixed restriction C is formed by a step d1 in the face of the portion $5_1$, facing the second distribution port $E_2$ and oppositely situated to the second variable restriction B, while, as in the previous embodiment, the second restriction D is formed between the central port I and the intermediate port F by a setback $d_2$ extending over the entire face of the second portion $5_2$ of the first distributor component 2.

This embodiment functions in the following manner. Assuming that the first distributor component 2 is displaced to the left (in FIG. 4) in relation to the second distributor component 3, the modulable restrictions A and B' will close and the modulable restrictions A' and B will open. At the same time the fixed restriction C is introduced into the fluid path between the chambers $E_2$ and $E_1$, and therefore directly downstream of the modulable restriction A, which closes. In the other circuit the fixed restriction D' is in turn put into operation between the chambers F and G, that is to say therefore directly downstream of the modulable restriction B', which closes. It will be noted that in this embodiment no fixed restriction is introduced into the return path between the relief chamber $V_1$ and the tank R, and that consequently the fixed restrictions are introduced solely downstream of the modulable restrictions which close in order to limit a flow of fluid under high pressure, the turbulence set up through said modulable restrictions being reduced by the back pressure produced by the fixed restrictions in the ports between each modulable restriction which closes and the associated fixed restriction, so as to achieve a substantially laminar flow in the return to the tank downstream of the fixed restrictions. FIG. 5 is a partial view, similar to FIG. 2, showing the arrangement of the ports shown in FIG. 4 in a distributor having a star-shaped rotor.

The embodiment illustrated in FIGS. 6 and 7 is in principle similar in every respect to that described in connection with FIGS. 4 and 5, except that in this case the circuit portions between the admission port O and the discharge port G are not formed in series, circumferentially, in each arm of the star-shaped rotor 2, the first portion of this circuit being formed on the periphery of each arm, while the second portion of this circuit is offset radially inwards, being closed in the base of the arms, as can clearly be seen in FIG. 7, the connection between these two circuit portions being made by a second distribution port $E_2$ of the second distributor component 3, which port is Z-shaped.

Referring again to FIG. 8, it will be noted that in the embodiment shown in FIGS. 1 and 2 the fixed restrictions C and D are disposed in the parallel circuit $\alpha$ in the positions indicated by the points $\gamma 2$ and $\delta$ respectively (the fixed restrictions C' and D' being arranged in the circuit $\alpha'$ at the points $\gamma 2'$ and $\delta'$). In the embodiments shown in FIGS. 4 to 7 the restrictions C and D of the circuit $\alpha$ are disposed at the points $\gamma 1$ and $\delta$ respectively, the fixed restrictions C' and D' being similarly disposed in the circuit $\alpha'$ at the points $\gamma 1'$ and $\delta'$.

I claim:

1. A hydraulic distributor, particularly for a power-assisted steering system for a vehicle, comprising a pair of parallel circuits between a pressurized fluid source and a tank, each parallel circuit comprising, in series, at least one first and one second modulable proportioning distribution restriction, the modulable proportioning distribution restrictions of the two circuits being adapted to be operated in synchronism by an inlet component of the distributor for the purpose of controlling a hydraulic motor having opposed chambers each connected to a respective parallel circuit at a point in the latter which is situated between the respective first and second modulable proportioning distribution restrictions, and further comprising a first fixed restriction put into operation by the inlet component in each parallel circuit and in synchronism with the modulable proportioning distribution restrictions, characterized in that the distributor comprises a second fixed restriction in each parallel circuit, the fixed restrictions adapted to be operated alternately in each parallel circuit by the inlet component and the restrictions disposed downstream of the respective first modulable proportioning distribution restriction, the first and second fixed restrictions also adapted to be put into operation downstream of the respective second modulable proportioning distribution restriction of each parallel circuit, the modulable proportioning distribution restrictions and the fixed restrictions formed by cooperating edges of ports formed in adjacent faces of two distributor components which are displaceable in relation to one another on each side of a central position, the fixed restrictions each formed by a recessed surface in at least one of the two distributor components, and the distributor components comprising a star-shaped rotor received in a discoid cavity in a stator, the recessed surfaces formed in the rotor.

2. A hydraulic distributor, particularly for a power-assisted steering system for a vehicle, comprising a pair of parallel circuits between a pressurized fluid source and a tank, each parallel circuit comprising, in series, at least one first and one second modulable proportioning distribution restriction, the modulable proportioning distribution restrictions of the two circuits being adapted to be operated in synchronism by an inlet component of the distributor for the purpose of controlling a hydraulic motor having opposed chambers each connected to a respective parallel circuit at a point in the latter which is situated between the respective first and second modulable proportioning distribution restrictions, and further comprising a first fixed restriction put into operation by the inlet component in each parallel circuit and in synchronism with the modulable proportioning distribution restrictions, characterized in that the distributor comprises a second fixed restriction in each parallel circuit, the first and second fixed restrictions adapted to be operated alternately in each parallel circuit by the inlet component and the fixed restrictions disposed downstream of the respective first modulable proportioning distribution restriction, the first and second fixed restrictions each adapted to be put into operation downstream of the associated modulable proportioning distribution restriction of the respective parallel circuit, the fixed restriction put into operation being the fixed restriction downstream of the modulable proportioning distribution restriction operated by the inlet component, in the closing direction, the modulable proportioning distribution restrictions and the fixed restrictions formed by cooperating edges of ports formed in adjacent faces of two distributor components which are displaceable in relation to one another on each side of a central position, the fixed restrictions each formed by a recessed surface in at least one of the two distributor components, and the distributor components comprising a star-shaped rotor received in a discoid cavity in a stator, the recessed surfaces formed in the rotor.

3. The distributor according to claim 2, characterized in that the recessed surface of at least one of the fixed restrictions of each parallel circuit extends between two adjacent portions of the corresponding distributor component.

4. The distributor according to claim 3, characterized in that the recessed surface of the first fixed restriction of each parallel circuit is formed near a chamber forming the second modulable proportioning distribution restriction of said parallel circuit.

5. The distributor according to claim 4, characterized in that the two distributor components are rotary.

6. The distributor according to claim 5, characterized in that adjacent faces of the distributor components are planar.

* * * * *